June 27, 1967     L. J. WINDECKER     3,328,229
METHOD AND APPARATUS FOR ATTACHING LOAD BEARING MEMBERS
TO LOW STRENGTH BODIES Filed Nov. 6, 1963     2 Sheets-Sheet 1

INVENTOR.
Leo J. Windecker
BY
Jerome Rudy
ATTORNEY

June 27, 1967 L. J. WINDECKER 3,328,229
METHOD AND APPARATUS FOR ATTACHING LOAD BEARING MEMBERS
TO LOW STRENGTH BODIES
Filed Nov. 6, 1963 2 Sheets-Sheet 2

INVENTOR.
Leo J. Windecker
BY
Jerome Budy
ATTORNEY

United States Patent Office 3,328,229
Patented June 27, 1967

3,328,229
METHOD AND APPARATUS FOR ATTACHING LOAD BEARING MEMBERS TO LOW STRENGTH BODIES
Leo J. Windecker, Midland, Tex., assignor to The Dow Chemical Company, Midland, Mich., a corporation of Delaware
Filed Nov. 6, 1963, Ser. No. 321,782
15 Claims. (Cl. 161—143)

This invention relates to a method and apparatus for connecting a high intensity load to a low strength body by distributing the load or stress over a large structural area from a point of high stress. More particularly, it concerns a connector having a bundle of unidirectional high strength fibers bonded thereto whereby the ends of the fibers may be broomed and cemented to a large area of a low strength body, thereby distributing the high intensity load over the large area.

There has been a longstanding problem of attaching load-bearing members to relatively low strength bodies. The practice often used is that of strengthening or reinforcing the body where the area of the load is to be attached. Although this may be effective it is not satisfactory where the weight of the body is important and where space limitations render the practice unsuitable. It has been customary to reinforce vehicle bodies made of laminated resin and fiber at points where the body is attached to the chassis to prevent premature failure. One problem which has hindered the use of light weight resinous fuselages in aircraft has been that of a reliable means for attaching the engine to a fuselage which does not have a rigid metal frame. I have discovered a method of attaching large loads to weak structures whereby the load is distributed over an area having sufficient aggregate strength to support the load.

The terms low strength body and weak structure referred to herein are structures having high tensile strength and a great deal of toughness but generally non-rigid and are not adapted to receive high density loads as in the case of metal structures. A typical low strength body is a thin-walled structure made up of layers of a fibrous material impregnated with a thermoset resin. The body is relatively flexible so that a load attached by means of bolts, rivets or the like passing through the layers of fibers and resin would be able to vibrate through a substantial amplitude. In addition to other problems associated with this type of mounting, the repeated flexing would produce premature failure of the mounting assembly.

According to my invention a connector adapted to receive high intensity loads is attached to the weak structure by a bundle of unidirectional high strength fibers saturated with a thermoset resin. The ends of the fibers protruding from the connector are broomed out and cemented to a large area of the weak structure by a thermosetting resin. A detailed description of my invention may be realized by reference to the attached drawings forming a part of this application.

Figure 1:
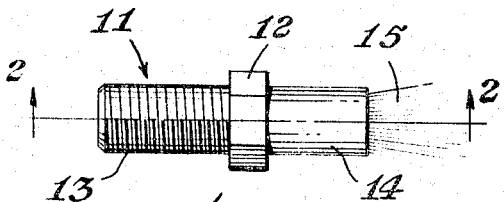
FIGURE 1 shows a connector which constitutes one embodiment of this invention.

The type of connector illustrated in FIGURES 1, 2A, 2B and 2C usually comprises connector body 11 having threads 13 on one end to provide a means for attaching a high intensity load to the connector. Wrench flats 12 may be provided to aid in tightening or loosening the nut securing the load to connector body 11. Tubular end 14 in FIGURE 2A opposite the threaded end accommodates fiber bundle 15, saturated with a resin as at 31 within the tubular body, with the ends of fibers 15 protruding from the tubular section being free of resin. The walls of tubular end 14 may be tapered and knurled as shown at 16 to facilitate the fill up of the tubular end with the resin-saturated fiber bundle and the exclusion of air bubbles, which afford an efficient mechanical bond between the resin and connector body. In the alternative, the inner surface of the tubular end may have ridged walls 32 as shown in FIGURE 6 to provide multiple wedge-like structures which aid in anchoring the fiber bundle therein.

Figure 2B:
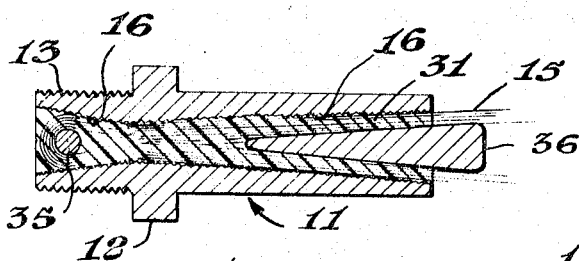
FIGURE 2B is a cross-sectional view of a second embodiment of the connector illustrated in FIGURE 1.
Figure 2C:
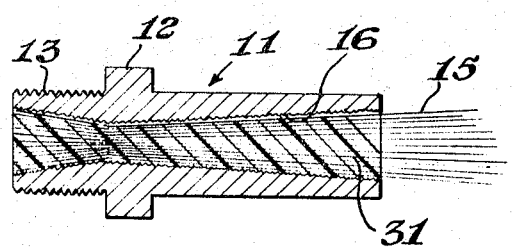
FIGURE 2C is a cross-sectional view of a third embodiment of the connector illustrated in FIGURE 1.

In FIGURES 2B and 2C connector body 11 has tapered walls 16 at both ends such that the glass fibers may extend completely through the body. The constriction between the tapered sections further aids in anchoring resin-impregnated fibers 31 inside the body. The device of FIGURE 2B includes pin 35 and cone or wedge 36. Glass fibers 15 are looped around the pin to produce a more positive anchor of the fibers in the connector body. The wedge or cone fans the glass fibers into a tubular bundle, thereby facilitating the attachment of the fibers to a large area of the low strength body.

Figure 3:
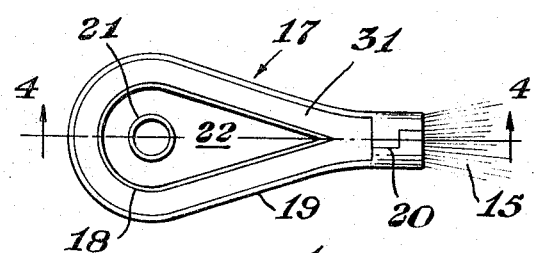
FIGURE 3 shows a connector which constitutes another embodiment of this invention.
Figure 2A:
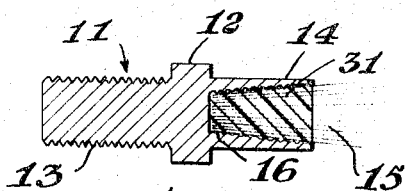
FIGURE 2A is a cross-sectional view of one embodiment of the connector shown in FIGURE 1, taken along the section 2—2.
Figure 4:
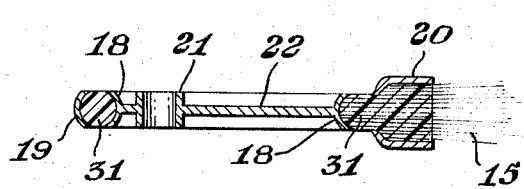
FIGURE 4 is a cross-sectional view of the connector shown in FIGURE 3 taken along section 4—4.

A connector adapted for attachment to a load by another means is illustrated in FIGURES 3 and 4. Loop connector body 17 has a loop of resin-impregnated unidirectional fibers 31 bound together by clasp 20 formed by the ends of housing 19 which passes around the bundle of fibers at the loop closure. Thimble 18 aids in shaping and retaining the loop as well as protects it from abrasion by applied loads. Bearing 21 in web 22 of the thimble may be provided to receive the high intensity load. Fibers 15 protruding from the clasp are free of resin so that they may be broomed out for attachment to a low strength structure.

Figure 5:
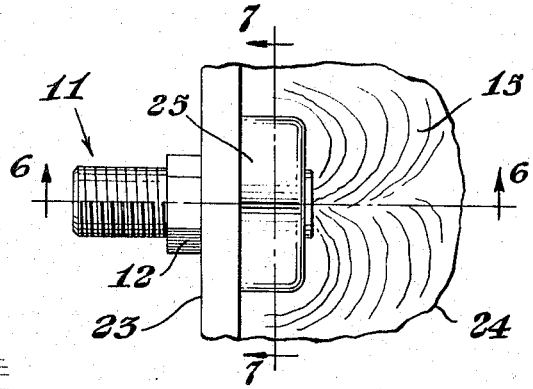
FIGURE 5 illustrates the attachment of a connector of the type shown in FIGURE 1 to a low strength structure.
Figure 6:
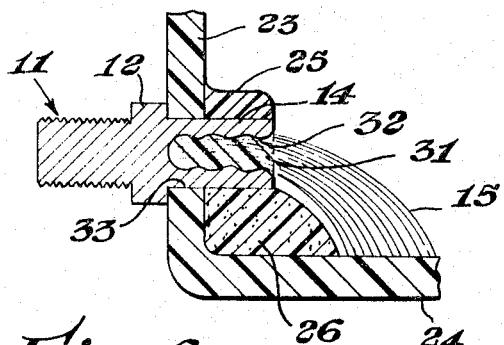
FIGURE 6 is a cross-sectional view of the structure and attached connector taken along section 6—6 of FIGURE 5.
Figure 7:
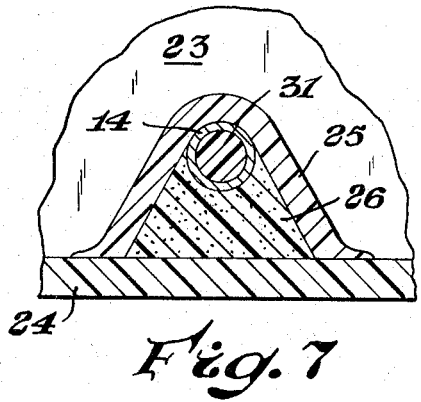
FIGURE 7 is a view in cross section of the structure and attached connector shown in FIGURE 5 along section 7—7.

In FIGURES 5, 6 and 7 it is shown how the connectors described above may be attached to a structure. In this instance, the connector passes through forward wall 23 near side wall 24. This particular structure might be used as aircraft engine mounts where wall 23 corresponds to the fire wall and 24 to the fuselage. Tubular end 14 of connector body 11 extends through hole 33 in wall 23 with the upset section having wrench flats 12 abutting against wall 23. The connector may be stabilized against radial motion which might cause enlargement of the hole through wall 23 by cementing block 26 of rigid foam between tube 14, forward wall 23 and side wall 24. Fiber bundle 15 is cemented inside tube 14 which may have convoluted or ridged walls 32 to provide an improved anchor of the bundle to the tube. Fibers 15 protruding from the end of the connector are broomed as illustrated in FIGURE 5 then impregnated with resins and cemented to side wall 24. Additional security may be provided by a mat of resin-impregnated fibers 25 over tube 14, rigid foam 26 and wall 24.

Connectors of the type shown in FIGURES 3 and 4 may be employed to attach light-weight plastic aircraft wings such as those taught in my copending application, Ser. No. 212,575, filed July 26, 1962, now abandoned. Fibers 15 protruding from clasp 20 may be cemented to a large area of the thin-wall, high tensile strength tubes projecting from the plastic wings. The loop connectors may be arranged so that bearings 21 are on a common axis for the top and bottom rows of tubes. This enables each wing to be attached to the keel of the plane with two pins in a hinge type joint.

Figure 8:
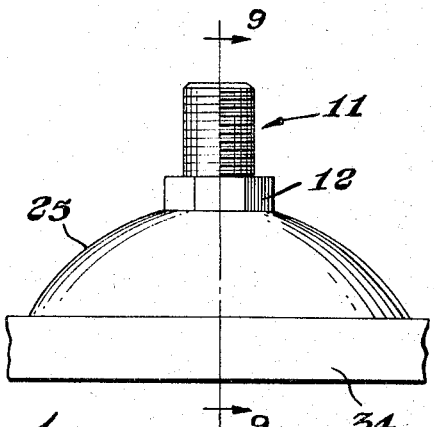
FIGURE 8 illustrates another manner in which the connector may be attached to a structure.
Figure 9:
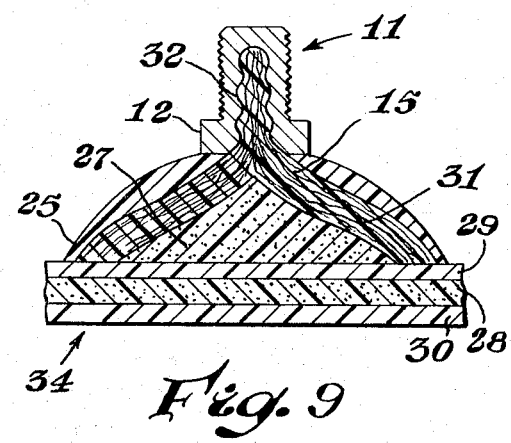
FIGURE 9 is a cross-sectional view of the connector and attached structure of FIGURE 8 taken along section 9—9.

The attachment of the connector perpendicular to a flat surface is shown in FIGURES 8 and 9. Laminated structure 34 comprising rigid foam 28 bonded between layers 29 and 30 of fiber reinforced resin has connector body 11 attached perpendicular to the surface. Conical spreading plug 27 may be bonded to the surface of structure 34 to avoid sharp bends in fibers 15 and aid in their uniform distribution over the low strength surface. The spreading plug may be made of a rigid foam similar to that at 28 in the center of structure 34. Connector body 11 of FIGURES 8 and 9 has dispensed with the tubular end as shown at 14 in FIGURE 1. The fiber bundle is anchored within the threaded portion of the connector body. The upset section with wrench flats 12 is located at the open end of the connector. Ridged or convoluted surface 32 may be provided to improve the anchorage of the resin impregnated bundle in the body. Fibers 15 protruding from connector body 11 are broomed out so that they cover plug 27 uniformly then a thermosetting resin is applied. If desired, impregnated fibers 31 may be protected and strengthened by laminated reenforcement 25 comprising a mat of fibers and resins which is applied over impregnated fibers 31.

Figure 10:
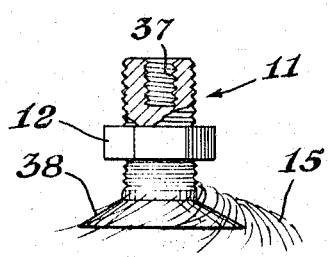
FIGURE 10 illustrates another embodiment of the apparatus shown in FIGURES 8 and 9.

FIGURE 10 shows an alternative connector body to that illustrated in FIGURES 8 and 9. Flared section 38 on body 11 provides an anchor for loops of glass fibers 15 with the fibers fanned out over a circular area surrounding the flared section. This type of connector body may be used in much the same manner as that in FIGURE 9 where the broom of glass fibers is cemented over a large, flat conical section of plastic foam attached to laminated structure 34. Threaded socket 37 provides a means for attaching the load. It should be understood that external threads may be used as in the body illustrated in FIGURE 9.

Figure 11:
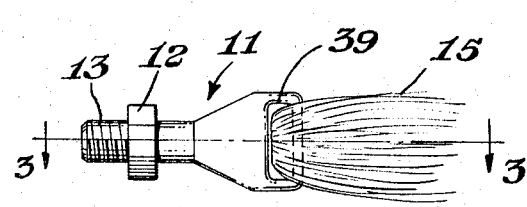
FIGURE 11 illustrates another type of load-bearing connector.
Figure 12:
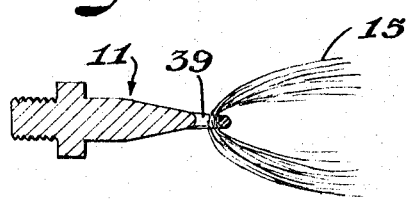
FIGURE 12 is a view of the connector illustrated in FIGURE 11, along section 3—3.

The connector illustrated in FIGURES 11 and 12 has particular utility in attaching loads to thin, elongated members. Eye 39 in connector body 11 receives loop of glass fibers 15. The ends of the fibers may be fanned out on opposite surfaces of a thin member then cemented in place with a thermosetting resin. Eye 39 may be filled with the resin when the glass fibers are impregnated and a portion of the resin feathered along the top and bottom of body 11 to provide rigidity in the connector.

There are several thermosetting resins which may be used to saturate the fiber bundle and prepare the laminates employed in producing connections according to this invention. Suitable resins include the epoxy resins, unsaturated polyesters, alkyds, amino resins, phenolics and the like.

The fiber bundle preferably is glass fibers having high unidirectional strength. Other fibers such as steel wire may be used, however they usually are less desirable in that they do not form a bond with resins as strong as that between glass and resins. Certain high tensile strength plastic filaments such as nylon also may be used.

The length of the fibers protruding from the connector should be sufficient to spread out in a broom covering an area of the low strength structure which provides ample support for the load to be borne by the connector. It is desirable that the bundle of fibers be enclosed in at least a portion of the metal connector body or attached uniformly around the connector body so that the load will be applied uniformly to the fibers in the bundles. Additionally, the connectors have maximum tensile strength in this position.

Reinforcing fibers in the various laminates which may be used to cover and anchor the broomed fibers may be the same as fibers 15 used to attach the connector to the low strength body or it may be a different material. Particularly useful forms are woven, stranded and chopped fibers. A short fiber material such as asbestos is sometimes desirable.

Spreading plug 27 shown in FIGURE 9 may be conical, wedge shaped, hemispherical, or other shape depending upon the direction in which it is desired to distribute the load applied to the connector. The plug may be made of various materials such as wood, ceramic, metal or a synthetic resin. Where the weight of the structure must be kept as low as possible as in aircraft, the plug may be shaped from balsa wood or a reinforced plastic foam such as a flexible polyurethane foam impregnated with a small quantity of an epoxy resin or other suitable thermosetting resin.

From the foregoing it can be seen that these connectors can receive a high intensity load on body 11 and transfer that load to a comparatively large area of a low strength structure such as wall 23 and adjacent wall 24 in FIGURES 5–7 or laminated structure 34 in FIGURES 8–9. Numerous ramifications utilizing this method and apparatus will be apparent to those skilled in the art. For convenience, threaded connections for the load-receiving apparatus are shown, however it should be understood that any of the common mechanical linkages may be used in place of the threaded connection.

I claim:
1. An apparatus for connecting a high intensity load to a low strength structure comprising a bundle of unidirectional high strength fibers having ends and a connector adapted to receive said high intensity load cemented thereto, said ends being remotely disposed from said connector, said bundle of fibers being cemented to said connector with a thermosetting resin which impregnates said bundle, in the immediate region of said connector, the ends of said fibers protruding from said connector being uncemented and freely spreadable for subsequent bonding to a large area of said low strength structure.

2. An apparatus according to claim 1 wherein said fibers are glass.

3. An apparatus for connecting a high intensity load to a low strength structure comprising a bundle of unidirectional high strength fibers having ends, a connector adapted to receive said high intensity load, at least a portion of said connector enclosing said bundle, the enclosed portion of said fiber bundle being impregnated with a thermosetting resin and bonded thereby to the connector, at least a portion of ends of said fibers disposed remotely from said connector and being spreadable over a large area of said low strength structure.

4. An apparatus according to claim 3 wherein said fibers are glass.

5. An apparatus for connecting a high intensity load to a low strength structure comprising a connector body having a tubular end passing through said low strength structure and an upset on said connector body resting against the outer surface of said structure, a stabilizing block of a rigid low density material cemented to the inner surface of said low strength structure and abutting said tubular end, a bundle of glass fibers cemented in said tubular end with the ends of said fibers protruding therefrom being spread over said stabilizing block and onto a portion of said low strength structure and cemented thereto with a thermosetting resin.

6. An apparatus for connecting a high intensity load to a low strength structure comprising an elongated connector body having load connection means at one end and a hollow tubular section at the other end with an upset section therebetween, said upset section having wrench flats thereon, and a bundle of unidirectional high strength glass fibers impregnated with a thermosetting resin and cemented in said tubular section with the ends protruding therefrom being flexible and uncemented.

7. An apparatus for connecting a high intensity load to a low strength structure comprising a loop of unidirectional high strength glass fibers, a housing enclosing the outer perimeter of said loop and having a clasp which surrounds said fibers at the closure of said loop, said fibers being impregnated with a thermosetting resin throughout said loop and the ends of said fibers protruding therefrom at said clasp being flexible and free of resin, a thimble inside said loop and cemented to the inner periphery thereof, and a bearing in said thimble adapted to receive said load.

8. An apparatus for connecting a high intensity load to a low strength structure comprising a connector body having load connecting means at one end and an eye at the other end, a bundle of high strength fibers looped through said eye with a thermosetting resin cementing said fiber bundle in said eye and the ends of said fibers extending from said connector body being spreadable for attachment to a large area of said low strength structure.

9. An apparatus for connecting a high intensity load to a low strength structure comprising an elongated tubular connector body having load connection means at one end, the thickness of the walls of said tubular body being tapered from the ends to a constriction therebetween; the inner surface of said tubular body being knurled, a bundle of unidirectional high strength fibers extending through said body and cemented to said knurled surface with a thermoset resin, the ends of said fibers protruding from the end of said body opposite said load connection means and freely spreadable over extended areas of said low strength structure.

10. The apparatus of claim 9 including a pin positioned within the tubular load receiving end of said body with said fibers looped therearound and a conical member inserted in the opposite end of said tubular member with said fibers uniformly distributed and cemented between said conical member and said knurled tapered walls of said tubular body.

11. A method of connecting a high intensity load to a low strength structure comprising:
impregnating a portion of a bundle of unidirectional high strength fibers with a thermosetting resin and cementing said saturated portion to a connector adapted to receive said high intensity load,
spreading the ends of said fibers protruding from said connector over a large area of said low strength structure and cementing said fibers to said structure with a thermosetting resin, thereafter,
connecting said high intensity load to said connector.

12. A method of attaching a load-bearing member to a low strength structure, said load-bearing member having means to receive a load at one end and means for attachment to said low strength structure at the other end comprising:
impregnating a portion of a bundle of unidirectional high strength fibers with a thermosetting resin, then
cementing said impregnated portion to the end of said load-bearing member having means for attachment to said structure with at least a portion of said load-bearing member enclosing said bundle,
placing said load-bearing member in said low strength structure whereby said load-receiving means is on one side of said low strength structure and the end of said member having said fiber bundle cemented thereto is on the opposite side of said structure,
cementing a block of a light-weight rigid material to said structure and the end of said member having said bundle cemented thereto; thereafter
spreading the fibers in said bundle protruding from said load-bearing member and cementing them to a large area of said low strength structure, then
covering said cemented fibers and the end of said member having said bundle of fibers cemented thereto with a thermosetting resin containing a fibrous reinforcing agent.

13. A method of attaching a load-bearing member to a low strength structure, said load-bearing member having means for receiving a load at one end and means for attachment to said low strength structure at the other end comprising:
cementing a bundle of unidirectional high strength fibers to said load-bearing member,
spreading the fibers in said bundle protruding from said member and cementing them to a large area of said low strength structure, then
covering said cemented fibers with a thermo-setting resin reinforced with a fibrous material.

14. A method of attaching a load-bearing member to a thin-walled tensile member comprising:
cementing a bundle of unidirectional high strength fibers to said load-bearing member thereby providing a plurality of unbonded ends protruding from said load-bearing member, then spreading the ends of said bundle protruding from the member, and
cementing the ends of said fibers protruding therefrom to a large area of said tensile member.

15. A method of attaching a load-bearing member to a low strength structure, said load-bearing member having means to receive a load at one end and means for attachment to said low strength structure at the other end comprising:
cementing unidirectional high strength fibers to said other end of said load-bearing member, with the ends of said fibers protruding therefrom and freely spreadable thereabout,
cementing a conical spreading plug to said low strength structure, then
uniformly distributing said protruding ends of said fibers over said spreading plug and cementing said fibers thereto.

References Cited

UNITED STATES PATENTS

| | | | |
|---|---|---|---|
| 2,495,951 | 1/1950 | Von Wehrden | 287—81 |
| 2,855,090 | 10/1958 | Zebley | 287—75 X |
| 3,129,282 | 4/1964 | Flynn | 287—124 X |
| 3,137,051 | 6/1964 | Bethea | 287—81 X |
| 3,229,341 | 1/1966 | Maras | 287—124 X |
| 3,235,289 | 2/1966 | Jones | 285—21 |

EARL M. BERGERT, *Primary Examiner.*

HAROLD ANSHER, *Examiner.*